United States Patent [19]

Gaudernack et al.

[11] 4,110,399

[45] Aug. 29, 1978

[54] PROCESS FOR THE EXTRACTION OF ALUMINA FROM ALUMINUM-CONTAINING SILICATES

[75] Inventors: Bjorn Gaudernack; Norvald Gjelsvik, both of Oslo; Leif Farbu, Strommen, all of Norway

[73] Assignee: Institutt for Atomenergi, Kjeller, Norway

[21] Appl. No.: 782,826

[22] Filed: Mar. 30, 1977

[30] Foreign Application Priority Data

Apr. 2, 1976 [NO] Norway .............................. 761136

[51] Int. Cl.$^2$ ............................. C01F 7/22; C01F 7/26
[52] U.S. Cl. .................................. 423/112; 423/126; 423/128; 423/132; 423/139
[58] Field of Search ................ 423/112, 126, 139, 132, 423/128

[56] References Cited

U.S. PATENT DOCUMENTS

| | | | |
|---|---|---|---|
| 3,082,062 | 3/1963 | Preuss ................................. | 423/112 |
| 3,211,521 | 10/1965 | George et al. ...................... | 423/112 |
| 3,240,561 | 3/1966 | Brown ................................. | 423/112 |
| 3,240,562 | 3/1966 | Brown et al. ...................... | 423/112 |
| 3,320,032 | 5/1967 | Feller ................................. | 423/112 |
| 3,323,865 | 6/1967 | Michener et al. .................. | 423/112 |
| 3,331,662 | 7/1967 | Feller ................................. | 423/112 |
| 3,586,481 | 6/1971 | Hyde et al. ........................ | 423/112 |
| 3,620,671 | 11/1971 | Maurel et al. ..................... | 423/128 |
| 3,816,590 | 6/1974 | Huska et al. ...................... | 423/112 |
| 3,862,293 | 1/1975 | Maurel et al. ..................... | 423/126 |

FOREIGN PATENT DOCUMENTS

| | | | |
|---|---|---|---|
| 1,558,347 | 2/1969 | France ................................ | 423/132 |
| 1,554,586 | 1/1964 | France ................................ | 423/126 |

*Primary Examiner*—Herbert T. Carter
*Attorney, Agent, or Firm*—Eyre, Mann, Lucas & Just

[57] ABSTRACT

A process for the extraction of alumina from aluminum-containing silicates is disclosed. The process comprises acid leaching of the raw material, iron extraction, precipitation of the aluminum fraction as the aluminum chloride hexahydrate, removal of sodium chloride and calcination to alumina. The process can be made continuous with substantial regeneration and recycling of process components.

12 Claims, 1 Drawing Figure

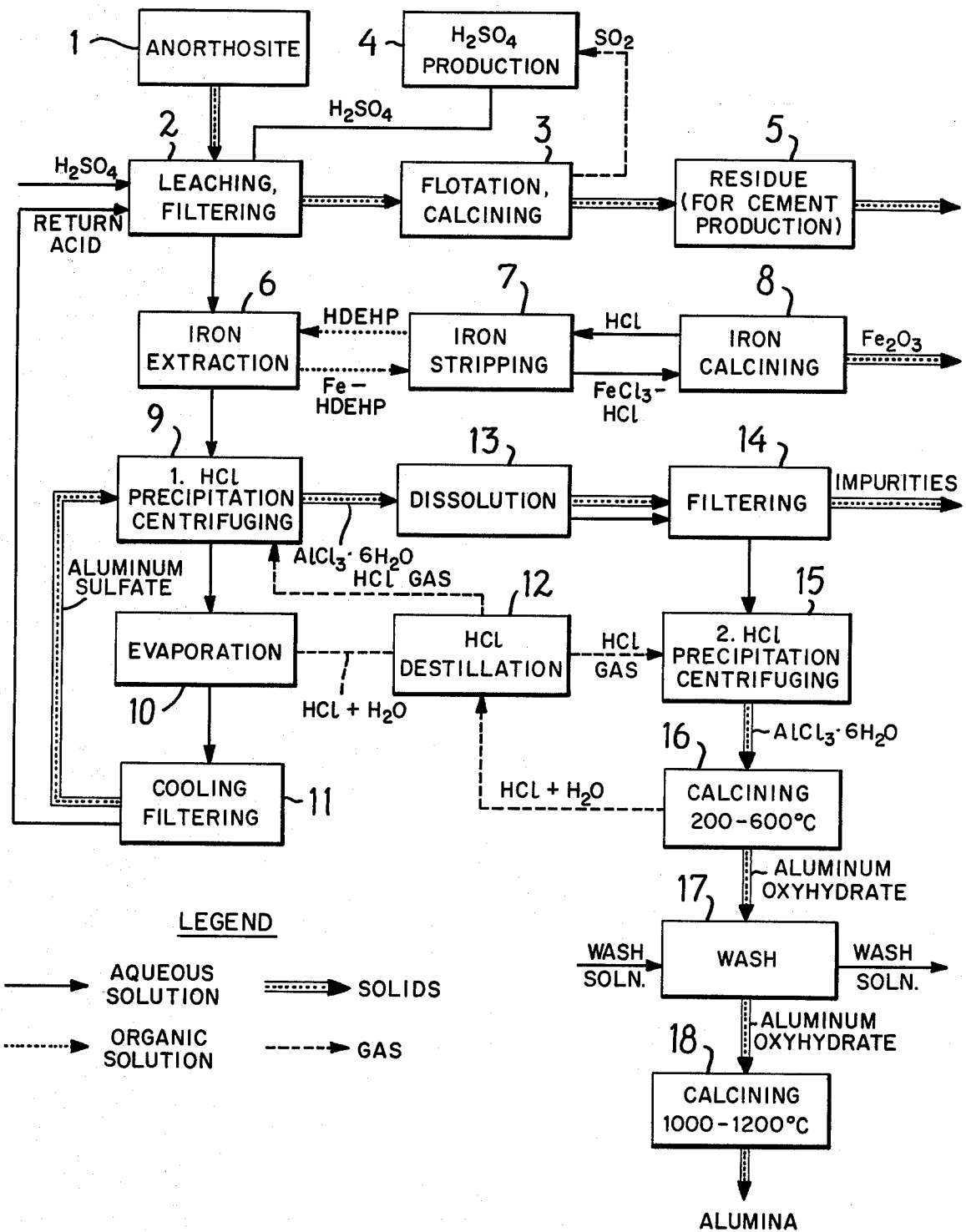

PROCESS FOR THE EXTRACTION OF ALUMINA FROM ALUMINUM-CONTAINING SILICATES

The present invention relates to the extraction of alumina from aluminum-containing silicate materials.

One of the more common processes for the production of aluminum is the Hall-Heroult process which is an electrolytic process for the production of aluminum from alumina dissolved in molten cryolite. For this process it is not necessary that the alumina be absolutely pure. By the same token, however, there may not be a substantial amount of impurities since these will both interfere with the aluminum producing process and result in aluminum production which is not sufficiently pure for most commercial purposes.

The alumina for the production of aluminum is largely obtained from bauxite, a natural aggregate which typically contains 30–57% alumina, 9–30% water, 3–25% ferrous oxide, 2–10% silica and 1–3% titanium dioxide. In recent years, however, the availability of good grade bauxite has diminished and the price has correspondingly increased. For this reason, considerable interest has been developed in the extraction of alumina from materials which have traditionally been considered less desirable because of the greater difficulty in extracting alumina of a purity high enough for the Hall-Heroult process therefrom. Typical of these materials are anorthites, anorthosites, feldspars and the like. A typical anorthosite may contain about 30% alumina, 50% silica, 15% calcium oxide, 3% sodium monoxide and lesser amounts of other materials, notably iron which is typically present in both the ferrous and ferric forms.

There have, of course, been known methods for the extraction of alumina from aluminum-containing silicates such as anorthosite. These are commonly alkaline processes which typically require that lime, soda or a combination of these are added to the raw material whereafter the mixture is calcined at high temperatures and then is subjected to an alkaline leach for the removal of the alumina. There have also been employed processes for acid leaching of alumina from aluminum-containing silicates but in these it has been found to be very difficult to remove many of the impurities and especially iron from the acid leach liquors in an economical and satisfactory manner especially where a continuous process is employed. Known acid leach processes also have other inherent disadvantages.

The applicants have now discovered a process for the acid leaching of alumina from aluminum-containing silicates which overcomes the disadvantages of prior acid leaching processes. In addition, the process according to the present invention does not normally require the high consumption of energy associated with calcining of the raw material as is present in known alkaline processes and, still further, there is no need for the consumption of lime or soda. A still further advantage over the alkaline process is that only small amounts of silica are soluble in the applicants' acid leach liquor thereby obviating the need for the expensive processes required for silica removal.

the applicants' process involves the following basic process steps:

(a) The aluminum-containing silicate, typically anorthosite, is reduced to an average particle size of no greater than about -50, i.e., it passes through a 50 mesh standard U.S. sieve.

(b) The comminuted anorthosite is treated with a sulfuric acid solution and, optionally including hydrochloric acid. This dissolves the aluminum along with other elements such as the alkali metals, magnesium, iron, etc. Calcium will also be dissolved but will precipitate immediately as calcium sulfate. The silica remains largely undissolved. The solids including the calcium sulfate and silica are separated and the filtrate is subjected to further process steps.

(c) The filtrate is treated with an organic extractant capable of selective extraction of iron. Typical organic extractants are the alkyl substituted phosphoric acids, notably di-(2-ethylhexyl) phosphoric acid.

(d) The solution with the iron substantially removed is then saturated with gaseous hydrogen chloride which results in precipitation of aluminum chloride hexahydrate and other precipitates such as alkali metal chlorides and magnesium chloride. Because the concentration of iron chlorides at this point will be relatively low, they will remain in solution and will not interfere with the precipitation.

(e) The aluminum chloride hexahydrate, if pure enough for the particular end use, is then calcined to obtain alumina. If the aluminum chloride hexahydrate is not pure enough at this point, it may be subjected to further process steps as discussed hereinbelow.

These and other important aspects may be more fully understood with reference to the flow chart of the drawing showing the preferred continuous process of the present invention and described as follows:

For the purpose of the present invention, anorthosite has been selected as the particular material to be discussed since it is illustrative of the aluminum-containing silicates. However, those skilled in the art will understand that the process according to the present invention is useful with any ore containing a high degree of silica (e.g., 20% by weight of the ore or more) since the silica content will remain largely undissolved in the initial sulfuric acid step and can thus be relatively readily removed at an early point in the process.

In many cases, and especially in many cases with anorthosites, satisfactory yields can be obtained without resorting to an energy consuming precalcination step. However, because of the properties of some ores, it may be necessary to precalcine the ore in order to obtain a sufficiently high yield of alumina. Even where precalcination is required, the present invention has advantage over the known alkaline leaching processes in that, as previously discussed, it is not necessary to add soda, lime or a combination of these before the calcination step.

In step 1 the anorthosite ore, whether or not calcined, is crushed and milled to have an average particle size which will pass at least a 50 mesh sieve, preferably a 100 mesh sieve and most preferably it is crushed and milled to the point where all of it will pass through a 200 mesh sieve.

The milled raw material is introduced to a leaching step 2. The leaching solution typically comprises from about 50 to about 750 grams per liter sulfuric acid, from 0 to about 300 grams per liter hydrochloric acid, minor amounts of impurities and q.v. water. The make-up sulfuric acid may be introduced in the pure form as shown or may be recycled from 4 as hereinafter discussed. The hydrochloric acid may be introduced as pure but is normally resulting from the process shown in box 11 as discussed hereinafter. The acid leaching is preferably performed at a temperature close to the boiling point of the leaching liquor in order to minimize digestion time. The temperature and time of digestion will necessarily vary according to the ore but it has been found that for certain anorthosites from the Western part of Norway, a digestion time of one – two hours near the boiling point of the leach liquor will dissolve more than 90% of the alumina content. As mentioned hereinbefore, the alkali metals, magnesium, iron, calcium, and some other elements will also dissolve to varying degrees. However, the silica will remain substantially undissolved and substantially all of the calcium will immediately precipitate as calcium sulfate crystals. The solids are separated from the mother liquor, suitably by filtration, centrifugation or other known techniques.

The solids, consisting primarily of silica and calcium sulfate, may be additionally treated as shown in box 3. Depending on the end result desired, the calcium sulfate and silica fractions may be separated by beneficiation methods such as froth flotation. In any case, the remaining residue may be calcined to produce sulfur dioxide gas which may be processed to produce sulfuric acid as shown in box 4 which sulfuric acid may then be recycled to the leaching step of box 2. The residue of the calcination of box 3 may be used to produce materials such as cement or wollastonite as shown in box 5 and, in addition, silica residue may be recovered.

Returning now to the primary process, the mother liquor from box 2 is next subjected to an iron extraction step as shown in box 6 to reduce the overall iron content which would otherwise build up to an unacceptable level as the process continued. The iron is suitably removed by a countercurrent process wherein the aqueous mother liquor is contacted with an organic solution immiscible therewith such as kerosene, which contains a compound which preferentially extracts iron from the mother liquor. Di-(2-ethylhexyl) phosphoric acid is preferred for this purpose.

The removed iron di-(2-ethylhexyl) phosphate extract may be regenerated by stripping with hydrochloric acid, box 7. In this way, iron chloride and di-(2-ethylhexyl) phosphoric acid are obtained, the latter of which can be recycled to the iron extraction step. The iron chloride may then be calcined to recover the iron oxide as shown at box 8 and hydrochloric acid may also be recovered which may be recycled to the stripping process as shown.

The mother liquor from step 6 with a substantial portion of the iron removed is then saturated with gaseous hydrogen chloride which results in the precipitation of aluminum chloride hexahydrate along with sodium chloride if sodium is present in the initial ore. Other impurities such as remaining silica and magnesium will also be present with the precipitated aluminum chloride hexahydrate. The precipitate is removed by a suitable process such as filtering or centrifuging. The remaining mother liquor may then be evaporated, box 10, to recover hydrochloric acid. A portion of the hydrochloric acid is distilled off as shown at box 12 and may be recycled to the precipitation step. The sulfuric acid and impurities remaining are cooled and then filtered to remove any remaining aluminum sulfate which is recycled to box 9 and then the sulfuric acid recovered may be recycled from box 11 to the original leaching step of box 2.

The solids obtained from box 9 are redissolved in a limited amount of water, the amount of water being only slightly in excess of that required to redissolve the aluminum chloride hexahydrate as shown at box 13. In this redissolving process, any impurities present will remain largely undissolved and may be removed by filtration or the like as shown at box 14.

The filtrate may then again be treated with gaseous hydrogen chloride as shown at box 15 with the hydrogen chloride being suitably obtained from the process of box 12, to again precipitate the aluminum chloride hexahydrate. The aluminum chloride hexahydrate is separated from the solution and is then calcined as shown at box 15 suitably at a temperature of from about 200° to about 600° C. to convert it to aluminum oxyhydrate by removal of hydrochloric acid and water which may be returned to box 12. The aluminum oxyhydrate is then washed with water or dilute hydrochloric acid to remove alkali metal chlorides and magnesium chlorides as shown at box 17. The washed residue is then dried and calcined to alumina typically at temperatures of 1,000–1,200° C. as shown in box 18. By this calcination, the aluminum oxyhydrate is converted to alumina.

The following Example describes a continuous process utilizing the present invention. Since the process is continuous, certain of the constituents were recycled from later steps in the process and this is the reason that certain impurities are present in some of the constituents.

The ore employed was a non-metamorphic anorthosite containing only small amounts of zoisite. 4,000 grams of ore were found to contain 1,200 grams of alumina, 1,900 grams of silica, 600 grams of calcium oxide, 112 grams of sodium monoxide, 20 grams of iron oxide and 168 grams of other constituents. Iron was found to be present in both the ferrous and ferric forms.

Without prior calcining, the 4,000 grams of ore were crushed and milled to pass a 100 mesh sieve and were admixed with a recycled mixture comprising sulfuric and hydrochloric acids from box 11 of the flow chart. The recycled mixture contained approximately 4,158 grams of sulfuric acid, 260 grams of hydrochloric acid, 9 grams of alumina, 36 grams of sodium monoxide, 111 grams of ferric oxide and smaller amounts of other elements. The admixture was heated to about 100° C. and was agitated for a period of about two hours. Thereafter, the admixure was filtered to remove solids. It was found that the filtrate contained about 90% of the aluminum which was present in the ore. The filter cake containing the solid residue was washed with water and was found to contain primarily silica and calcium sulfate.

The filtrate had a volume of 15.5 liters and was found to contain 1,080 grams alumina, 121 grams ferric oxide, 137 grams sodium monoxide, 13,200 grams water, 3,103 grams of sulfate ions, 458 grams of chloride ions and small amounts of other materials. To this filtrate was added wash solutions from later steps in the process which consisted of 120 grams aluminum chloride, 47 grams sodium chloride, 2,461 grams hydrogen chloride and 4,750 grams of water. The temperature of the resulting liquor at this point was about 50° C.

An aliquot portion of about 6 liters of the resulting liquor was removed for the purpose of demonstrating the iron extraction step. The 6 liters of removed liquid was contacted with 3 liters of a solution of di-(2-ethylhexyl) phosphoric acid in kerosene in a four stage countercurrent process. At the end of the treatment, approximately 80% of the iron was removed from the aqueous phase and substantially none of the aluminum had been extracted under these conditions.

The organic phase of the iron removal process was continuously regenerated by contacting it with a 6 N hydrochloric acid solution in a countercurrent three stage process. The volume of the hydrochloric acid was approximately one-fifth of the volume of liquid of the organic phase. During the regeneration process, the iron concentration increased to about 20 grams of iron per liter and the acid concentration decreased to about 5 N. The iron containing hydrochloric acid solution was evaporated and the solid iron chloride was then calcined. These steps resulted in the production of iron oxide and 6 N hydrochloric acid which could be recycled to the stripping process.

The remainder of the 6 liter aliquot portion with iron removed was recombined with the main stream and the main process stream was at this point found to contain 1,126 grams alumina, 162 grams sodium monoxide, 111 grams ferric chloride and 3,103 grams of sulfate ions in addition to water. This solution was not treated with 6,012 grams of gaseous hydrogen chloride which resulted in precipitation of aproximately 99% of the aluminum present as aluminum chloride hexahydrate together with 80% of the sodium present as sodium chloride. The precipitated crystals were removed by centrifugation.

The supernatant liquid from the centrifugation was distilled to recover hydrochloric acid. The supernatant liquid contained 9 grams alumina, 36 grams sodium monoxide, 111 grams ferric oxide, 3,103 grams of sulfate ions, 6,347 grams of chloride ions and 15,585 grams water. The distillation step removed 6,054 grams of hydrogen chloride gas and 2,959 grams of water as steam. The distillate was used in further processes as shown in box 12 and the remaining liquid was cooled, filtered and returned to the original leaching step as hereinbefore described.

The centrifugate comprised 2,924 grams aluminum chloride, 238 grams sodium chloride, and 2,365 grams of water, primarily in the form of the hexahydrate of the aluminum chloride. The centrifugate also contained small amounts of other elements. This centrifugate was washed with 4,264 additional grams of water at a temperature of 45° C. which resulted in dissolution of substantially all of the aluminum with 119 grams of sodium chloride remaining undissolved. The undissolved sodium chloride was removed by filtration.

The filtrate with the sodium chloride removed was treated with 2,216 grams of gaseous hydrogen chloride whereby the aluminum chloride was reprecipitated as the hexahydrate and the remaining sodium chloride was also reprecipitated. The precipitated crystals were removed by centrifugation and were then washed with a hydrochloric acid solution consisting of 245 grams hydrogen chloride and 414 grams water.

The washed precipitate was found to contain 2,804 grams aluminum chloride, 72 ggams sodium chloride, 2,268 rams water and small amounts of other elements. The washed precipitate was calcined at temperatures between 200° C. and 600° C. to convert the aluminum chloride hexahydrate to aluminum oxyhydrate and hydrochloric acid, the latter of which was recycled to box 12. The aluminum oxyhydrate was washed with water to remove any remaining chlorides and was then calcined to yield alumina. The alumina was analyzed and was found to contain less than 0.1% sodium, less than 0.1% silicon, less than 0.01% calcium and less than 0.01% iron. The alumina thus obtained is suitable for use in the Hall-Heroult process for the production of aluminum.

While the above is illustrative of the process of the present invention, it will be understood that the claims are intended to cover all changes and modifications of the preferred embodiment of the invention, herein chosen for the purpose of illustration, which do not constitute departure from the spirit and scope of the invention.

What is claimed is:

1. A process for the extraction of alumina from aluminum-containing silicates comprising:
   (a) treating an aluminum-containing silicate with an aqueous solution comprising sulfuric acid whereby a substantial portion of the aluminum is dissolved;
   (b) separating the solids of step (a) from the liquid portion;
   (c) treating at least a part of the aqueous liquid portion from step (b) with an organic liquid substantially immiscible with the aqueous solution and containing an organic extractant capable of preferential extraction of iron over aluminum whereby iron is extracted into the organic liquid phase;
   (d) separating the aqueous liquid phase from the organic liquid phase and treating the aqueous liquid phase with gaseous hydrogen chloride whereby aluminum chloride hexahydrate is precipitated;
   (e) separating the aluminum chloride hexahydrate precipitate from the aqueous liquid phase;
   (f) subjecting the aqueous liquid phase from step (e) to heat whereby hydrochloric acid is evaporated therefrom and recovering the hydrochloric acid and recycling at least a portion of it to step (d);
   (g) recycling at least a portion of the remaining aqueous liquid phase of step (f) to step (a);
   (h) calcining the aluminum chloride hexahydrate from step (e) at a temperature of from about 200° C to about 600° C whereby the aluminum chloride hexahydrate is converted to aluminum oxyhydrate and hydrochloric acid;
   (i) separating the hydrochloric acid from the aluminum oxyhydrate;
   (j) washing the aluminum oxyhydrate with water or dilute hydrochloric acid whereby any alkali metal chlorides and magnesium chlorides are removed; and
   (k) calcining the aluminum oxyhydrate to alumina at a temperature above about 1000° C.

2. The process of claim 1 wherein the aluminum-containing silicate is anorthosite.

3. The process of claim 1 wherein the solution comprising sulfuric acid of step (a) further comprises hydrochloric acid.

4. The process of claim 3 wherein the solution comprising sulfuric acid of step (a) comprises from about 50 to about 750 grams per liter sulfuric acid and from 0 to about 300 grams per liter hydrochloric acid.

5. The process of claim 1 wherein the aluminum-containing silicate is reduced to an average particle size of no greater than about −50.

6. The process of claim 5 wherein substantially all of the aluminum-containing silicate is reduced to a size no greater than about −200.

7. The process of claim 1 wherein the organic extractant is di-(2-ethylhexyl) phosphoric acid.

8. The process of claim 1 wherein between steps (e) and (h) the solids comprising the aluminum chloride hexahydrate are redissolved in aqueous solution and thereafter reprecipitated with hydrogen chloride gas before the calcining of step (h)

9. The process of claim 1 wherein the solids from step (b) are treated to regenerate sulfuric acid.

10. The process of claim 1 wherein the iron containing organic phase from step (c) is treated with hydrochloric acid which is thereafter evaporated and the residue calcined to recover iron oxide and regenerate hydrochloric acid.

11. A process for the extraction of alumina from anorthosite comprising:
(a) treating anorthosite with an aqueous solution comprising sulfuric acid whereby a substantial portion of the aluminum contained in the anorthosite is dissolved;
(b) separating the solids of step (a) from the liquid portion;
(c) treating at least a part of the aqueous liquid portion from step (b) with an organic liquid substantially immiscible with the aqueous solution and containing an organic extractant capable of preferential extraction of iron over aluminum whereby iron is extracted into the organic liquid phase;
(d) separating the aqueous liquid phase from the organic liquid phase and treating the aqueous liquid phase with gaseous hydrogen chloride whereby aluminum chloride hexahydrate is precipitated;
(e) separating the aluminum chloride hexahydrate precipitate from the aqueous liquid phase;
(f) subjecting the aqueous liquid phase from step (e) to heat whereby hydrochloric acid is evaporated therefrom and recovering the hydrochloric acid and recycling at least a portion of it to step (d);
(g) recycling at least a portion of the remaining aqueous liquid phase of step (f) to step (a);
(h) calcining the aluminum chloride hexahydrate from step (e) at a temperature of from about 200° C to about 600° C whereby the aluminum chloride hexahydrate is converted to aluminum oxyhydrate and hydrochloric acid;
(i) separating the hydrochloric acid from the aluminum oxyhydrate;
(j) washing the aluminum oxyhydrate with water or dilute hydrochloric acid whereby the alkali metal chlorides and magnesium chlorides are removed; and
(k) calcining the aluminum oxyhydrate to alumina at a temperature above about 1000° C.

12. A process for the extraction of alumina from aluminum-containing silicates comprising:
(a) treating an aluminum-containing silicate with an aqueous solution comprising sulfuric acid whereby a substantial portion of the aluminum is dissolved;
(b) separating the solids of step (a) from the liquid portion;
(c) treating at least a part of the aqueous liquid portion from step (b) with an organic liquid substantially immiscible with the aqueous solution and containing an organic extractant capable of preferential extraction of iron over aluminum whereby iron is extracted into the organic liquid phase;
(d) separating the aqueous liquid phase from the organic liquid phase and treating the aqueous liquid phase with gaseous hydrogen chloride whereby aluminum chloride hexahydrate is precipitated;
(e) separating the aluminum chloride hexahydrate precipitate from the aqueous liquid phase;
(f) subjecting the aqueous liquid phase from step (e) to heat whereby hydrochloric acid is evaporated therefrom and recovering the hydrochloric acid and recycling at least a portion of it to step (d);
(g) cooling and filtering the remaining aqueous liquid phase from step (e) whereby solids are precipitated and recycling at least a portion of the solids recovered to step (d) and at least a portion of the liquid recovered to step (a);
(h) calcining the aluminum chloride hexahydrate from step (e) at a temperature of from about 200° C to about 600° C whereby the aluminum chloride hexahydrate is converted to aluminum oxyhydrate nd hydrochloric acid;
(i) separating the hydrochloric acid from the aluminum oxyhydrate;
(j) washing the aluminum oxyhydrate with water or dilute hydrochloric acid whereby any alkali metal chlorides and magnesium chlorides are removed; and
(k) calcining the aluminum oxyhydrate to alumina.

* * * * *

UNITED STATES PATENT AND TRADEMARK OFFICE
CERTIFICATE OF CORRECTION

PATENT NO. : 4,110,399
DATED : August 29, 1978
INVENTOR(S) : Gaudernack et al

It is certified that error appears in the above-identified patent and that said Letters Patent are hereby corrected as shown below:

Column 1, line 19, "30-57%" should read --30-75%--.

Column 1, line 63, "the" should read --The--.

Column 5, line 19, "not" should read --now--.

Column 5, line 57, "ggams" should read --grams--.

Column 5, line 58, "rams" should read --grams--.

Signed and Sealed this

Fifth Day of June 1979

[SEAL]

Attest:

RUTH C. MASON
Attesting Officer

DONALD W. BANNER
Commissioner of Patents and Trademarks